United States Patent [19]

Komatsu et al.

[11] Patent Number: 5,029,028
[45] Date of Patent: Jul. 2, 1991

[54] SINGLE-MOTOR CHANGING TAPE PLAYER

[75] Inventors: Norimasa Komatsu; Asashi Miyazaki, both of Kakuda, Japan

[73] Assignee: Alps Electric Co., Ltd., Tokyo, Japan

[21] Appl. No.: 428,279

[22] Filed: Oct. 26, 1989

[30] Foreign Application Priority Data

Feb. 1, 1989 [JP] Japan ................................ 1-11543[U]
Feb. 1, 1989 [JP] Japan ................................ 1-11544[U]

[51] Int. Cl.$^5$ .......................... G11B 21/22; G11B 5/54
[52] U.S. Cl. .................................... 360/105; 360/96.4; 360/90; 360/96.3
[58] Field of Search ..................... 360/105, 96.3, 96.4, 360/83, 90, 92, 137

[56] References Cited

U.S. PATENT DOCUMENTS

| | | | |
|---|---|---|---|
| 4,571,647 | 2/1986 | Tanaka et al. | 360/105 X |
| 4,656,552 | 4/1987 | Takahashi et al. | 360/90 |
| 4,674,001 | 1/1987 | Takahashi et al. | 360/96.4 |
| 4,734,806 | 3/1988 | Komatsu | 360/105 |
| 4,922,357 | 5/1990 | Komatsu et al. | 360/105 X |

*Primary Examiner*—Robert S. Tupper
*Assistant Examiner*—Alfonso Garcia
*Attorney, Agent, or Firm*—Guy W. Shoup; Paul J. Winters

[57] ABSTRACT

A tape player which is reduced in number of parts to permit the space on a head base to be utilized effectively and easy to assemble. The tape player comprises a pinch roller shaft secured to a head base, and a torsion coil spring interposed between the head base and a slide base for urging the head base toward a reel base. When the slide base is moved toward the reel base, the head base is moved in the same direction by way of the torsion coil spring. When the slide base is further moved after stopping of the head base with the pinch roller contacted with a capstan, the torsion coil spring is compressed thereby to resiliently contact the pinch roller with the capstan with a tape held therebetween. The slide base has first and second guide elements formed thereon. The first guide element is fitted in a first guide slot formed in the head base to guide the head base for sliding movement on the slide base. The second guide element is fitted in a second guide slot formed in a chassis to guide the slide base for sliding movement on the chassis.

2 Claims, 6 Drawing Sheets

SINGLE-MOTOR CHANGING TAPE PLAYER

BACKGROUND OF THE INVENTION

1. Field of the Invention

This invention relates to a tape player for use with an automatic telephone message recorder, and more particularly to a tape player having a structure which includes a head base and a slide base.

2. Description of the Prior Art

A tape player for use with an automatic telephone message recorder exemplarily has such a construction as shown in FIG. 8. The tape player shown is of the same type as is disclosed, for example, in U.S. Pat. No. 4,734,806, U.S. Pat. No. 4,922,357 and U.S. application Ser. No. 07/424,359 filed Oct. 19, 1989.

The tape player includes a chassis 51, a slide base 52, and a head base 53.

A pair of positioning pins 57a and 57b are provided on the chassis 51. A micro cassette (not shown) is thus positioned by the positioning pins 57a and 57b and loaded on a pair of reel bases not shown and a capstan 58.

The head base 53 is supported on the chassis 51 for sliding movement in the opposite directions indicated by a double-sided arrow mark A-B in FIG. 8 under the guidance of three guide pins 61a, 61b and 61c. The head base 53 and the slide base 52 have generally similar configurations to each other and are supported for individual sliding movement with the head base 53 placed in an overlapping relationship on the slide base 52. The slide base 52 is connected at an upper end thereof in FIG. 8 to a plunger Sa of a solenoid S. A spring hook 52a is formed at a left end of the slide base 52 in FIG. 8, and a return spring 54 extends between the spring hook 52a and a bent lug 51a at a left end of the chassis 51 in FIG. 8. Thus, the slide base 52 is normally urged by the resilient force of the return spring 54 in the direction of the arrow mark B so that it may be moved away from the reel bases. Meanwhile, a bent engaging lug 52b is formed at a right end portion of the slide base 52 and normally held in engagement with a front edge of a right end portion of the head base 53. Accordingly, when the slide base 52 is returned in the direction of the arrow mark B by the return spring 54, the engaging lug 52b of the slide base 52 pushes to move the head base 53 back in the direction of the arrow mark B. Further, a connecting spring 56 extends between the engaging lug 52b of the slide base 52 and a bent lug 53a at an end of the head base 53 so that, when the slide base 52 is pulled by the solenoid S to move in the direction of the arrow mark A toward the reel bases, the head base 53 is pulled to move in the direction of the arrow mark A by way of the connecting spring 56.

A magnetic head H is securely mounted on the head base 53 so that it may move in the directions of the double-sided arrow mark A-B together with the head base 53.

When a reproducing (recording) operation is to be carried out, the solenoid S is energized to attract the plunger Sa. Consequently, the slide base 52 connected to the plunger Sa is pulled to move in the direction of the arrow mark A, and also the head base 53 is moved in the direction of the arrow mark A by way of the connecting spring 56. The head base 53 is stopped at a position at which it abuts with the positioning pins 57a and 57b as shown in FIG. 8. In this condition, the magnetic head H on the head base 53 contacts with a tape within the micro cassette. As the plunger Sa of the solenoid S is attracted fully to its limit position, the slide base 52 is moved farther in the direction of the arrow mark A than the stopping position of the head base 53 shown in FIG. 8. As a result, the pinch roller P is contacted under pressure by the force of a spring not shown with the tape held therebetween to permit the tape to be fed for play (reproduction or recording) thereof.

However, such a conventional tape player as described above has a problem that, because it includes three springs, it has a comparatively large number of parts and is complicated in assembling operation.

Further, at least three guide pins 61a to 61c are necessitated in order to assure smooth sliding movement of the slide base 52 and the head base 53, and the number of parts is increased as much. Further, since sliding movement of the slide base 52 (and the head base 53) on the chassis 1 and sliding movement of the slide base 52 on the head base 53 are guided by the same guide pins 61a to 61c, it is necessary to assure the same spacings for such sliding movement around the guide pins 61a to 61c in the directions of the double-sided arrow mark A-B. Accordingly, there is a problem that there is much restriction to the spacing for locations of parts on the head base 53 and the space on the head base 53 cannot be utilized effectively.

SUMMARY OF THE INVENTION

It is an object of the present invention to provide a tape player which is reduced in number of parts and easy to assemble.

It is another object of the present invention to provide a tape player which is reduced in number of parts to permit the space on a head base to be utilized effectively.

In order to attain the objects, according to one aspect of the present invention, there is provided a tape player which comprises a chassis, a reel base and a capstan supported for rotation on the chassis and connected to be driven to rotate by a motor, a head base supported for movement toward and away from the reel base and having a pinch roller shaft and a magnetic head secured thereto, the pinch roller shaft having a pinch roller supported for rotation thereon, a slide base interposed between and supported on the head base and the chassis for sliding movement toward and away from the reel base, a torsion coil spring engaged at one end thereof with the head base and at the other end thereof with the slide base for urging the head base to approach the reel base with respect to the slide base, an engaging element provided on at least one of the head base and the slide base for holding the head base and the slide base in a mutually overlapping condition against the urging force of the torsion coil spring, a resilient member for urging at least one of the slide base and the head base to move away from the reel base, and a driving mechanism for moving the slide base toward the reel base against the urging force of the resilient member.

In the tape player, the pinch roller shaft is secured to the head base and the torsion coil spring is interposed between the head base and the slide base such that the head base may be urged toward the reel base with respect to the slide base.

Accordingly, when the slide base is moved toward the reel base, also the head base is moved in the same direction by the urging force of the torsion coil spring. Then, when the slide base is further moved toward the reel base after the head base has been stopped at a position in which the pinch roller is contacted with the capstan and the magnetic head is contacted with a magnetic tape, the torsion coil spring is compressed thereby. Thus, the pinch roller is contacted under pressure with the capstan by the resilient force of the torsion coil spring against such compression thereby to allow feeding of the tape for play (recording or reproducing operation).

In this manner, the provision of the single torsion coil spring enables movement of the head base following the slide base when the slide base is moved toward the reel base as well as resilient contact of the pinch roller with the capstan upon recording or reproducing operation. Accordingly, the number of parts of the tape player can be reduced, and the tape player can be simplified in mechanism and also in assembling operation.

According to another aspect of the present invention, there is provided a tape player which comprises a chassis, a slide base mounted for sliding movement in an overlapping relationship on the slide base, a head base mounted for sliding movement in an overlapping relationship on the slide base and having a magnetic head mounted thereon, and a driving mechanism for moving the slide base in a direction to contact the magnetic head with a magnetic tape, the slide base having an upwardly bent first guide element and a downwardly bent second guide element formed in an integral relationship thereon, the head base having a first guide slot formed therein, the first guide element of the slide base being inserted in the first guide slot of the head base for guiding the head base for sliding movement on the slide base, the chassis having a second guide slot formed therein, the second guide element of the slide base being inserted in the second guide slot of the chassis for guiding the slide base for sliding movement on the chassis.

With the tape player, the first guide element of the slide base can be slidably moved in a longitudinal direction of the first guide slot of the head base (toward or away from the reel base) within the first guide slot. Accordingly, the slide base is guided for sliding movement with respect to the head base by the first guide element.

Meanwhile, the second guide element of the slide base can be slidably moved in a longitudinal direction of the second guide slot of the chassis (toward or away from the reel base) within the second guide slot. Accordingly, the slide base is guided for sliding movement with respect to the chassis by the second guide element.

Thus, since the first and second guide elements are formed in an integral relationship on the slide base, at least one of guide pins which are required at least three in a conventional tape player can be omitted, and the number of parts can be reduced as much.

Further, the first guide element for guiding the slide base for sliding movement with respect to the head base is provided separately from the second guide element for guiding the slide base for sliding movement with respect to the chassis. Besides, the extent over which the slide base is slidably moved with respect to the head base is very small comparing with the extent over which the slide base is slidably moved with respect to the chassis. Accordingly, the space for such sliding movement to be provided around the first guide element may be a very small space, and the space on the head space can be utilized effectively as much and the device can be reduced in overall size as much.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
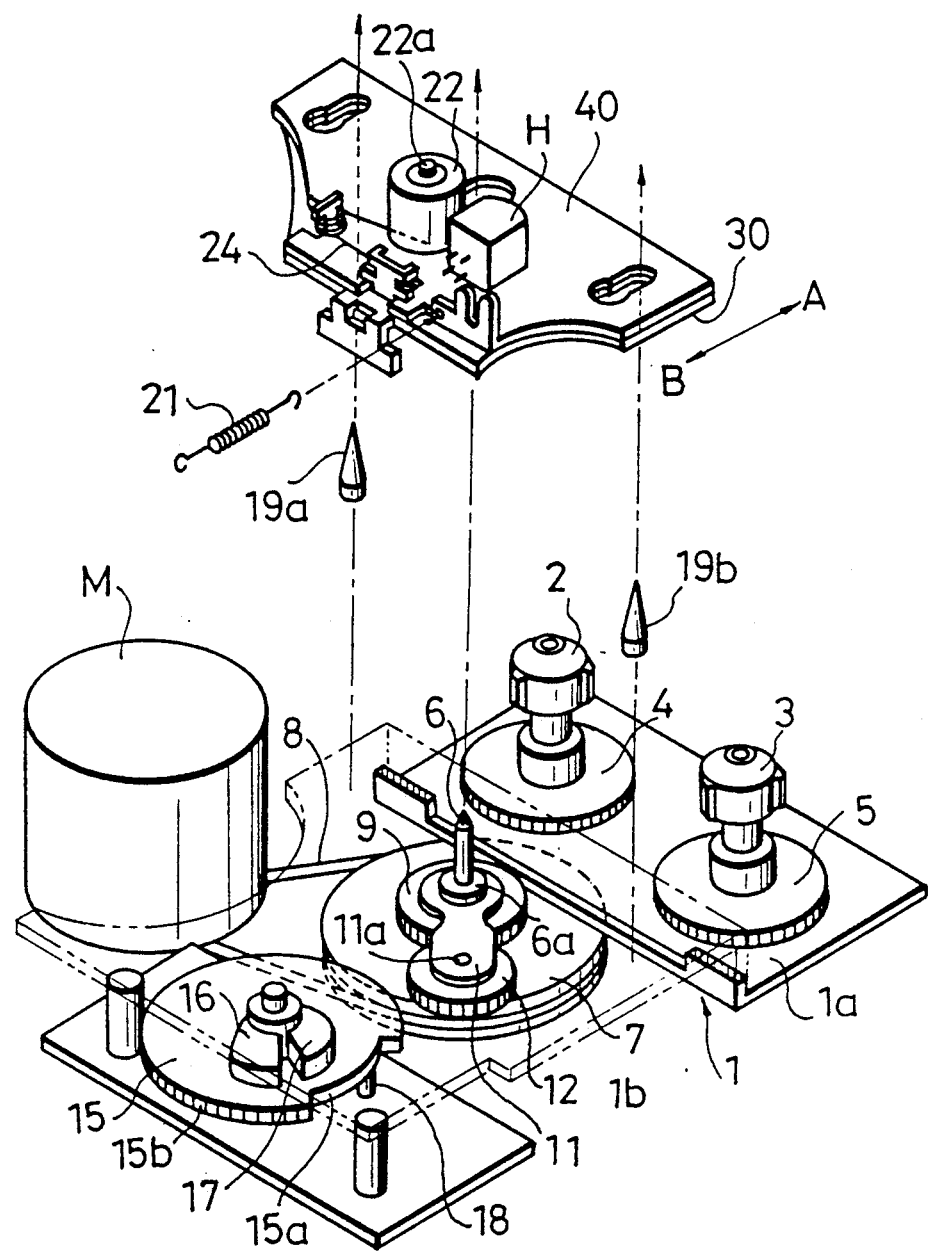
FIG. 1 is a perspective view showing general construction of a tape player according to a preferred embodiment of the present invention.

Referring first to FIG. 1, there is shown a tape player according to a preferred embodiment of the present invention. The tape player shown is constructed such that a tape cassette of a micro size or a so-called micro cassette may be loaded thereon. The tape player includes a chassis 1 formed from a metal plate. The chassis 1 is bent in a crank-like shape in side elevation so as to present a two-stage structure having a lower installation wall 1a and an upper installation wall 1b.

A reel base 2 on the take-up side and another reel base 3 on the supply side are supported for rotation on the lower installation wall 1a of the chassis 1. A reel gear 4 is provided at a base portion of the take-up side reel base 2 while another reel gear 5 is provided at a base portion of the supply side reel base 3. A slip mechanism not shown is interposed between the reel gear 4 and the reel base 2 and also between the reel gear 5 and the reel base 3 so that, when the reel base 2 or 3 is acted upon by a tension of a tape, a slip may take place between the reel base 2 or 3 and the reel gear 4 or 5 to absorb a possible difference between the tape taking up speed and the speed of rotation of the reel gear 4 or 5.

A bearing (not shown) is carried on the upper installation wall 1b of the chassis 1 by means of a housing 6a, and a capstan 6 is supported for rotation by means of the bearing. A flywheel 7 is integrated with the capstan 6 and located below the upper installation wall 1b. A motor M is provided at a side portion of the chassis 1, and a belt 8 extends between a drive pulley not shown of the motor M and the flywheel 7 so that the capstan 6 may be driven to rotate together with the flywheel 7 by the motor M. A drive gear 9 is provided on an upper face of the flywheel 7 for integral rotation with the capstan 6. A gear arm 11 is supported on the housing 6a provided on the upper installation wall 1b of the chassis 1, and a planetary gear 12 is provided at an end portion of the gear arm 11 and normally held in meshing engagement with the drive gear 9. A light turning load is applied between a shaft 11a provided on the gear arm 11 and the planetary gear 12 supported for rotation on the shaft 11a by means of a spring or the like not shown. Due to the presence of the load, when the capstan 6 and the drive gear 9 are rotated in either direction, the gear arm 11 is pivoted in the direction of such rotation following them, whereupon the planetary gear 12 is revolved around the drive gear 9. Then, if the drive gear 9 is rotated in the clockwise direction, the planetary gear 12 which is revolved around the drive gear 9 soon comes to a position in which it meshes with the take-up side reel gear 4. But on the contrary, if the drive 9 is rotated in the counterclockwise direction, then the planetary gear 12 soon comes to another position in which it meshes with the supply side reel gear 5.

A mode change-over gear 15 is provided on the lower side of the upper installation wall 1b of the chassis 1. The mode change-over gear 15 is disposed at a location at which it is brought into meshing engagement with the planetary gear 12 during revolving movement of the planetary gear 12 from the position in which it meshes with the reel gear 4 to the other position in which it meshes with the other reel gear 5. The mode change-over gear 15 has teeth 15b formed over a predetermined angular range of an outer periphery thereof with a non-toothed portion 15a left thereon. When a portion of the mode change-over gear 15 at which the teeth 15b are provided opposes to the planetary gear 12 which revolves around the drive gear 9, the force of rotation of the planetary gear 12 is transmitted to the mode change-over gear 15 by way of the teeth 15b. To the contrary, when the non-toothed portion 15a of the mode change-over gear 15 opposes to the revolving planetary gear 12, the planetary gear 12 passes by the non-toothed portion 15a so that it moves along the revolving locus thereof without driving the mode change-over gear 15.

Figure 3:
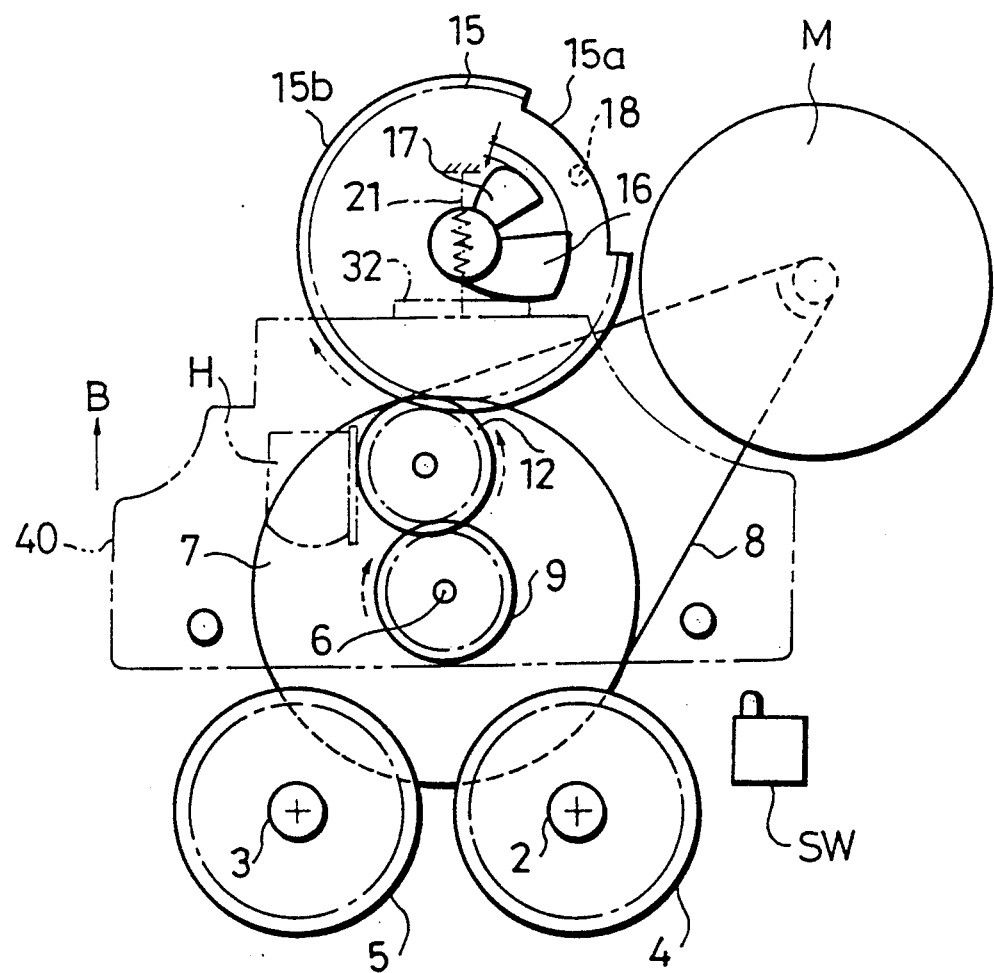
FIGS. 3 and 4 are plan views illustrating operations of the tape player of FIG. 1 in a stop mode and a play mode, respectively.

A first change-over cam 16 and a second change-over cam 17 are provided on an upper face of the mode change-over gear 15. Referring also to FIG. 3, the second change-over cam 17 has a smaller radius by a small dimension t than the radius of the first change-over cam 16. A stopper 18 is provided on and extends downwardly from a lower face of an edge portion of the non-toothed portion 15a of the mode change-over gear 15. The stopper 18 is located at such a circumferentially intermediate position between the change-over cams 16 and 17 as shown in FIG. 3.

A slide base 30 and a head base 40 are provided in a mutually overlapping relationship on an upper face of the upper installation wall 1b of the chassis 1. As particularly shown in FIG. 2, an upper guide lug 31 and a lower guide lug 32 are formed at a rear end portion of the slide base 30 by bending. A pair of guide holes 33 are perforated at left and right locations of the slide base 30 and extend linearly in the directions indicated by the double-sided arrow mark A-B. When the slide base 30 is placed on the chassis 1, the guide pins 19a and 19b are fitted in the guide holes 33 while the lower guide lug 32 is fitted in a guide slot 1c perforated in the chassis 1. Consequently, the slide base 30 is slidably moved in the direction indicated by the arrow mark A or B with respect to the chassis 1 under the guidance of the guide pins 19a and 19b and the lower guide lug 32.

A lower end of the lower guide lug 32 of the slide base 30 serves as a contacting portion which is contacted by the first change-over cam 16 or the second change-over cam 17 on the mode change-over gear 15. The slide base 30 is moved to its position for the play mode or the review mode in response to operation of the mode change-over gear 15 as the lower guide lug 32 thereon is pushed by the change-over cam 16 or 17.

Figure 2:
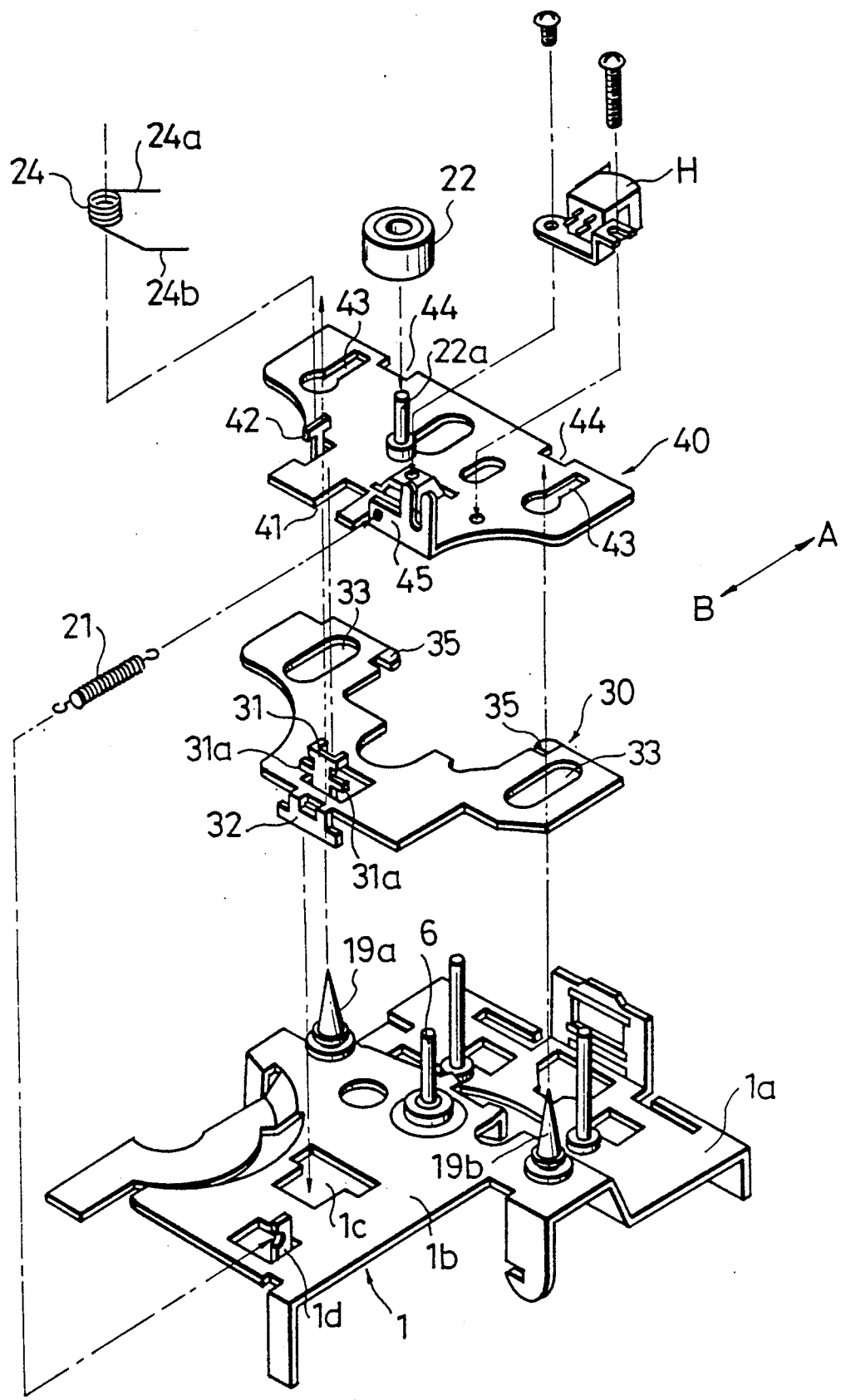
FIG. 2 is a fragmentary perspective view particularly showing a head base, a slide base and a chassis of the tape player of FIG. 1.

A pinch roller shaft 22a is secured to the head base 40 as shown in FIG. 2, and the pinch roller 22 is supported for rotation on the pinch roller shaft 22a. A guide slot 41 is formed at a rear end portion of the head base 40 and extends in the directions of the double-sided arrow mark A-B. A pair of guide holes 43 are perforated at left and right locations of the head base 40 and extend linearly in the directions of the double-sided arrow mark A-B. When the head base 40 and the slide base 30 are placed on the chassis 1, the guide pins 19a and 19b on the chassis 1 are fitted in the guide holes 43.

When the head base 40 is to be placed onto the slide base 30, it is slidably moved in the direction of the arrow mark B in a partially overlapping condition on the slide base 30 such that a portion of the upper guide lug 31 below a pair of projections 31a which extend laterally leftwardly and rightwardly from a central portion of the upper guide lug 31 may be inserted into the guide slot 41. A projection 42 is formed to extend upwardly in FIG. 2 from the head base 40, and a torsion coil spring 24 is fitted at a central portion thereof around the projection 42. An end portion 24a of the torsion coil spring 24 is engaged with a lower end of the pinch roller shaft 22a while the other end portion thereof is engaged with the upper guide lug 31 of the slide base 30. Thus, the pinch roller shaft 22a and hence the head base 40 are normally urged in the direction of the arrow mark A with respect to the slide base 30 by the resilient force of the torsion coil spring 24. A pair of engaging lugs 35 are formed at left and right symmetrical locations at a front end portion of the slide base 30 with respect to the directions of the double-sided arrow mark A-B by bending in obliquely upwardly. The engaging lugs 35 of the slide base 30 are engaged with cutaway portions 44 formed at a front end portion of the head base 40. While the head base 40 is normally urged in the direction of the arrow mark A with respect to the slide base 30 or in other words the slide base 30 is normally urged in the direction of the arrow mark B with respect to the head base 40 by means of the torsion coil spring 24, the head base 40 and the slide base 30 are held in a mutually overlapping condition by the engaging lugs 35. Accordingly, in a condition wherein the torsion coil spring 24 is mounted in position, the slide base 30 and the head base 40 are combined in a mutually overlapping condition without being separated from each other and can thus be treated like a single part (refer to FIG. 1). The slide base 30 and the head base 40 can thus be assembled to the chassis 1 by fitting the assembly of the bases 30 and 40 onto the guide pins 19a and 19b and inserting the lower guide lug 32 of the slide base 30 into the guide slot 1c of the chassis 1.

A spring hook 45 is provided at a rear end of the head base 40, and a spring 21 extends between the spring hook 45 and a bent lug 1d at a rear end portion of the chassis 1. The head base 40 and the slide base 30 are thus normally urged in the direction of the arrow mark B by the resilient force of the spring 21. While the head base 40 is placed on the chassis 1 with the slide base 30 interposed therebetween, the head base 40 and the slide base 30 are slidably moved in an integral relationship with each other in the directions of the double-sided arrow mark A-B under the guidance of the guide pins 19a and 19b and so forth. In particular, when the slide base 30 is driven by the change-over cam 16 or 17 on the mode change-over cam 15 to move in the direction of the arrow mark A, also the head base 40 is moved in the same direction by the urging force of the torsion coil spring 24 (the force for urging the head base 40 in the direction of the arrow mark A with respect to the slide base 30). On the other hand, when the change-over cam 16 or 17 is spaced from the lower guide lug 32 on the slide base 30, the head base 40 is pulled back in the direction of the arrow mark B by the spring 21 whereupon the upper guide lug 31 of the slide base 30 is pushed by an end of the guide slot 41 of the head base 40 so that the slide base 30 is also pulled back in the direction of the arrow mark B.

Since the upper guide lug 31 of the slide base 30 is movable in the directions of the double-sided arrow mark A-B within the guide slot 41 of the head base 40, the slide base 30 is slidingly movable in the directions of the double-sided arrow mark A-B with respect to the head base 40.

Figure 4:
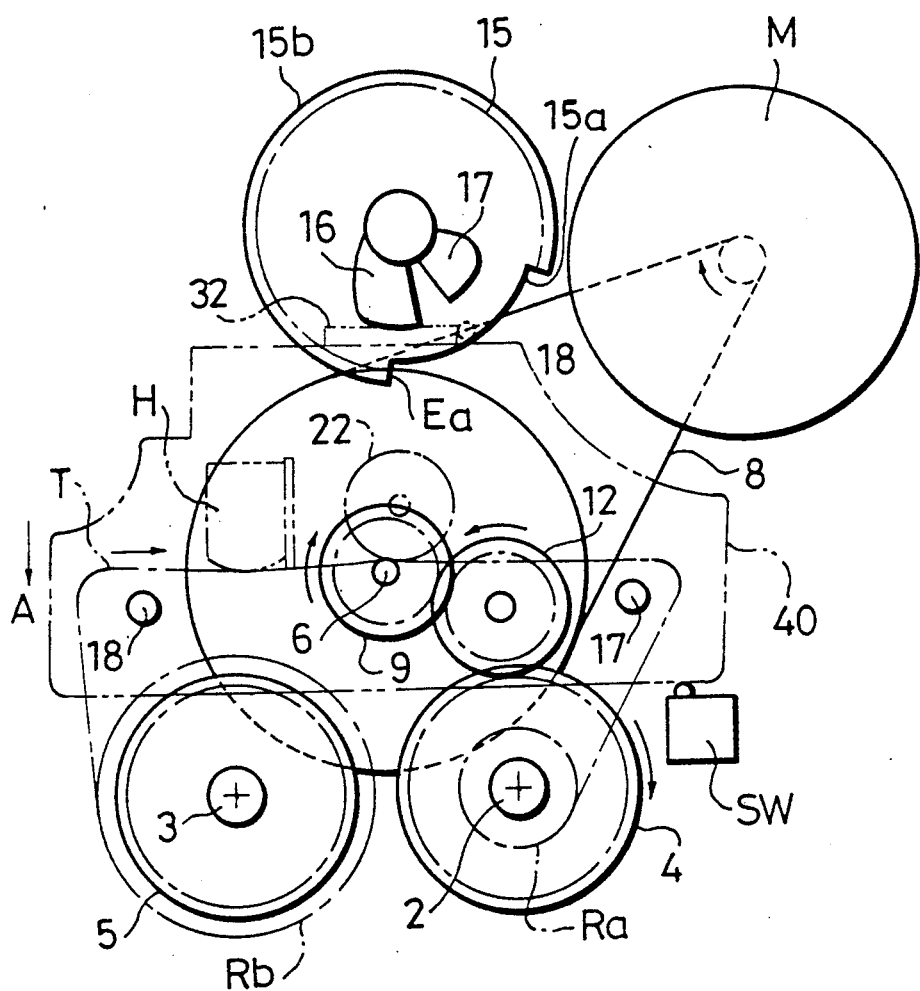
Figure 5:
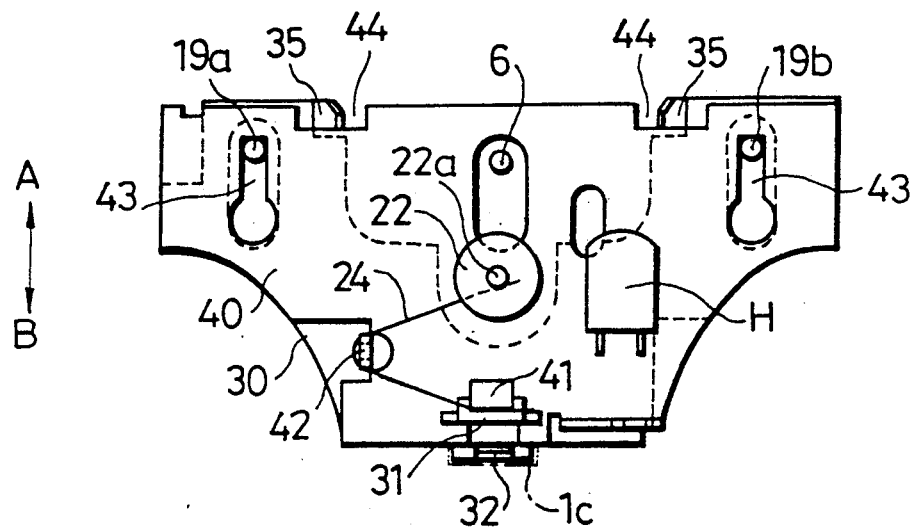
FIGS. 5, 6 and 7 are plan views showing the slide base and the head base of the tape player of FIG. 1 at different positions during transition from the stop mode to the play mode.

Meanwhile, as shown in FIGS. 3 and 4, a detecting switch SW is provided on the upper installation wall 1a of the chassis 1. The detecting switch SW is turned on when the head base 40 is advanced in the direction of the arrow mark A to a play mode position (refer to FIG. 4) or a review mode position at which the magnetic head H contacts with a magnetic tape T, but on the contrary when the head base 40 is retracted in the direction of the arrow mark B, the detecting switch SW is turned off.

Subsequently, operation of the tape player having such a construction as described above will be described with reference to FIGS. 3 to 6.

A tape cassette (not shown) of a so-called micro size is loaded in a condition positioned by means of the guide pins 19a and 19b. In short, in the tape player of the present embodiment, the guide pins 19a and 19b have two functions of positioning of the tape cassette and guidance of the slide base 30 and the head base 40 for sliding movement in the directions of the double-sided arrow mark A-B. Thus, tape reels not shown within the tape cassette are mounted on the reel bases 2 and 3.

FIG. 3 shows the tape player mechanism in the stop mode. In the stop mode, the first change-over cam 16 and the second change-over cam 17 on the mode change-over gear 15 are held out of engagement with the lower guide lug 32 of the slide base 30, and the slide base 30 and the head base 40 are urged in the direction of the arrow mark B by the force of the spring 21. The slide base 30 which is pulled in the direction of the arrow mark B by the spring 21 is stopped at a position at which the lower guide lug 32 thereon almost contacts with a rear end of the guide slot 1c of the chassis 1 (refer to FIG. 5) as the lower guide lug 32 is contacted with a side edge portion of the first change-over cam 16 (refer to FIG. 3). When the slide base 30 and the head base 40 are positioned in this manner, the magnetic head H is spaced from the magnetic tape within the tape cassette and the pinch roller 22 is spaced from the capstan 6.

When the tape player is to be changed over from the stop mode of FIG. 3 to the recording or reproducing mode (play mode), the motor is driven to rotate in the clockwise direction (indicated by a broken line arrow mark in FIG. 3) in the condition shown in FIG. 2. When the drive gear 9 is driven to rotate in the clockwise direction by the motor M, the planetary gear 12 is revolved in the clockwise direction following the drive gear 9 so that it is brought into meshing engagement with the mode change-over gear 15 with certainty. Thus, the power of the motor M is transmitted to the mode change-over gear 15 by way of the drive gear 9 and the planetary gear 12 so that the mode change-over gear 15 is driven to rotate in the clockwise direction. While the mode change-over gear 15 is driven to rotate in this manner, the planetary gear 12 remains at the position. Then, after the mode change-over gear 15 is rotated to the position shown in FIG. 4, the non-toothed portion 15a of the mode change-over gear 15 comes to the position of the planetary gear 12 so that the planetary gear 12 is thereafter spaced from an end Ea of the toothed 15b portion of the mode change-over gear 15. The planetary gear 12 after having been thus spaced from the end Ea of the toothed 15b portion then revolves in the clockwise direction around the drive gear 9 until it comes to the position at which it meshes with the takeup side reel gear 4 as shown in FIG. 4 (play mode). During the movement from the position of FIG. 3 to the position of FIG. 4, the first change-over cam 16 is rotated in the clockwise direction together with the drive gear 15 which is rotated in the clockwise direction. Consequently, the first change-over cam 16 is contacted with the lower guide lug 32 of the slide base 30 so that the slide base 30 and the head base 40 are pushed out in the direction of the arrow mark A against the force of the spring 21. Although the planetary gear 12 is spaced from the end Ea of the toothed 15b portion of the drive gear 15 during the changing-over operation, the stopper 18 provided on the mode change-over gear 15 is contacted with a right edge of the lower guide lug 32 on the slide base 30. Accordingly, in the play mode shown in FIG. 4, the mode change-over gear 15 cannot be rotated any more in the clockwise direction and the end Ea of the toothed 15b portion of the mode change-over gear 15 will not be moved in the clockwise direction. Further, since the stopper 18 is engaged with the edge of the lower guide lug 32 of the slide base 30, the slide base 30 is positioned thereby.

Figure 6:
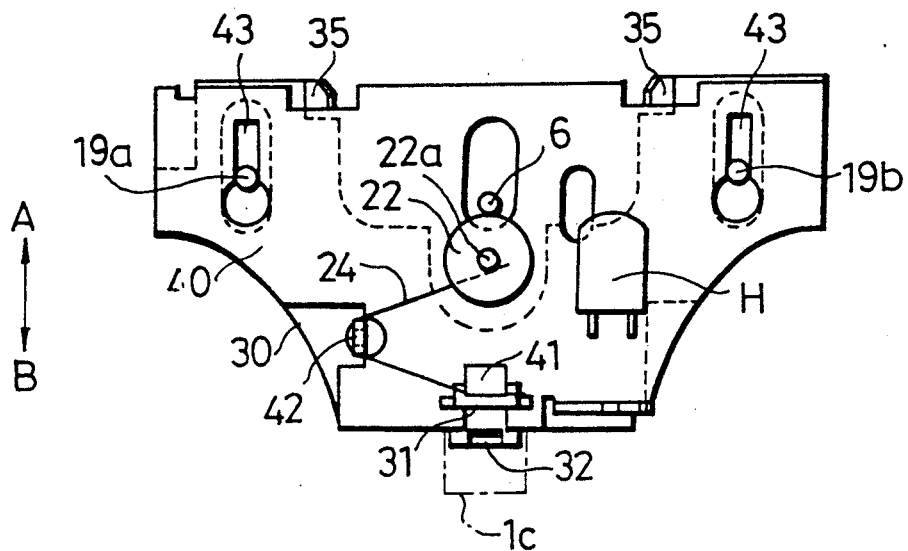
Figure 7:
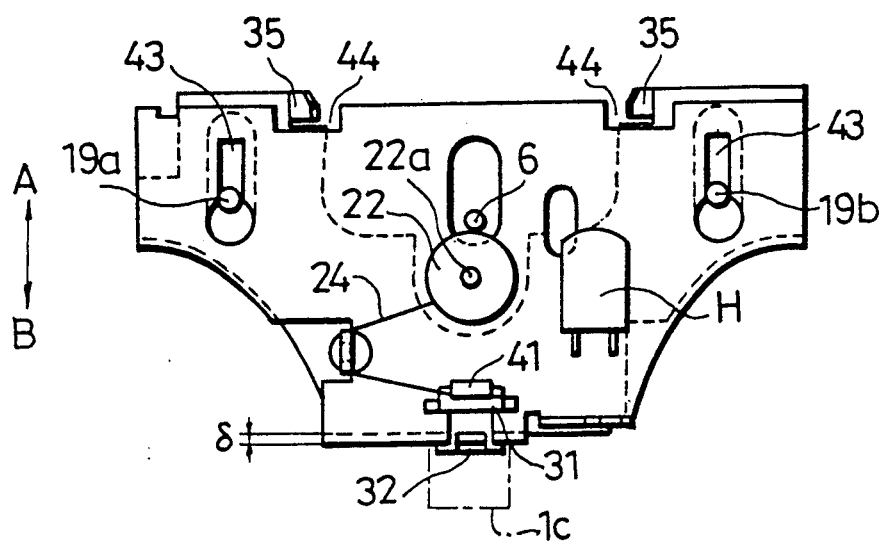
Figure 8:
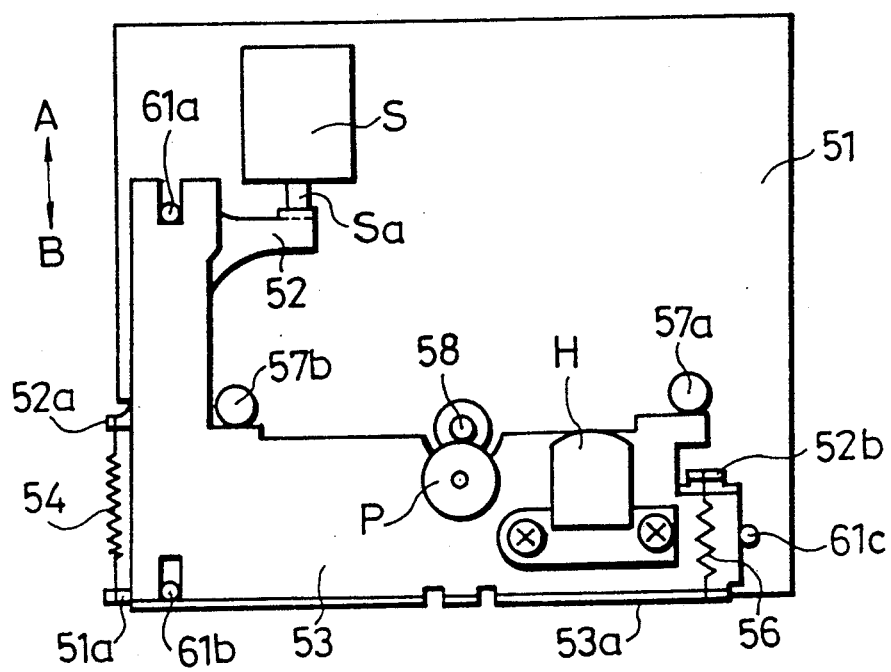
FIG. 8 is a plan view showing a head base of a conventional tape player.

On the other hand, if the pinch roller 22 is moved until it is contacted with the capstan 6 during the movement of the slide base 30 and the head base 40 in the direction of the arrow mark A in response to the changing over operation, then the head base 40 is stopped there from further movement in the direction of the arrow mark A (refer to FIG. 6). After such stopping of the head base 40, the slide base 30 is further pushed out but by a small distance δ in the direction of the arrow mark A by the first change-over cam 16 as shown in FIG. 7 until the stopper 18 is contacted by an edge portion of the lower guide lug 32. While the slide base 30 is slidably moved further by the distance δ in the direction of the arrow mark A with respect to the stopped head base 40 in this manner, the torsion coil spring 24 is compressed thereupon by the same dimension δ. Thus, the pinch roller 22 is contacted under a predetermined pressure with the capstan 6 by the resilient force of the torsion coil spring 24 against the compression.

In the play mode shown in FIG. 4, since the head base 40 is at its advanced position in the direction of the arrow mark A, the magnetic head H provided on the head base 40 contacts with a tape T within the micro cassette. Meanwhile, the pinch roller 22 presses the tape T against the capstan 6. Since the motor M continues to rotate in the clockwise direction, the capstan 6 is also rotated in the clockwise direction so that the tape T held between the capstan 6 and the pinch roller 22 is fed in the rightward direction in FIG. 4 at a fixed speed substantially equal to the circumferential speed of rotation of the capstan 6. Meanwhile, the power of the motor M is transmitted to the reel gear 4 by way of the drive gear 9 and the planetary gear 12 to drive the take-up side reel base 2 to rotate in the clockwise direction. Consequently, the take-up side tape reel Ra within the tape cassette is driven to rotate in the clockwise direction to effect taking up of the tape. It is to be noted that a possible difference between the speed of rotation of the reel base 2 and the speed of the tape being fed by the capstan 6 is absorbed by the slip mechanism interposed between the reel gear 4 and the reel base 2.

Recording operation or reproducing operation of the tape T which is fed in the rightward direction in FIG. 4 by the capstan 6 in this manner is carried out by the magnetic head H. The magnetic head H used may be, for example, of the type which includes a recording/reproducing head and an erasing head integrated with each other as a single block.

When the play mode shown in FIG. 4 is to be canceled, the direction of rotation of the motor M is changed over to the counterclockwise direction. When the drive gear 9 is driven to rotate in the counterclockwise direction by the motor M, the planetary gear 12 starts it revolving movement in the direction of rotation of the drive gear 9 whereupon it is spaced from the reel gear 4 to interrupt the transmission of the power to the take-up side reel base 2. During such revolving movement of the planetary gear 12, the planetary gear 12 is soon brought into meshing engagement with the end Ea of the toothed 15b portion of the mode change-over gear 15. After the planetary gear 12 is meshed with the teeth 15b of the mode change-over gear 15, the power of the motor M is transmitted to the mode change-over gear 15 from the drive gear 9 by way of the planetary gear 12 so that the mode change-over gear 15 is driven to rotate in the counterclockwise direction. Consequently, the pressing force of the first change-over cam 16 against the lower guide lug 32 of the slide base 30 is removed, and as a result, the head base 40 and the slide base 30 are returned in the direction of the arrow mark B by the force of the spring 21 to retract the magnetic head H to a position in which it does not contact with the tape T while the pinch roller 22 is spaced away from the capstan 6.

It is to be noted that, while particular illustration and description are omitted, when the review mode is entered wherein a tape is fed at a high speed in the rewinding direction or in the fast feeding direction while the magnetic head H remains in light contact with the tape, the lower guide lug 32 of the slide base 30 is pushed in the direction of the arrow mark A by the second change-over cam 17 to move the head base 40 to a position in which the magnetic head H contacts lightly with the tape and the pinch roller 22 is spaced by a small distance from the capstan 6.

As described so far, in the tape player of the present embodiment, the pinch roller shaft 22a is secured to the head base 40 and the opposite end portions of the torsion coil spring 24 are engaged with the lower end of the pinch roller shaft 22a and the upper guide lug 31 of the slide base 30. Accordingly, coupling between the head base 40 and the slide base 30 (so as to cause the slide base 40 to follow the slide base 30 when the slide base 30 is moved in the direction of the arrow mark A) and resilient contact of the pinch roller 22 with the capstan 6 in the play mode can be achieved by the single torsion coil spring 24 without employing two springs as in the conventional tape player described hereinabove. Accordingly, the number of parts can be reduced and the assembling operation can be simplified.

Further, while particularly in the tape player of the present embodiment one end of the torsion coil spring 24 is engaged with the pinch roller shaft 22a and the other end end is engaged with the the upper guide lug 31 provided in the sliding direction (in the direction of the arrow mark A or B) while the engaging portions 35 of the slide base 30 with the head base 40 are provided at left and right symmetrical locations with respect to the sliding direction, a stabilized operation can be attained upon sliding movement of the head base 40 or upon contacting engagement of the pinch roller 22 with the capstan 6.

It is to be noted that, while in the tape player of the present embodiment the engaging portions 35 are formed on the slide base 30 in order to hold the head base 40 and the slide base 30 in a mutually overlapping relationship at a predetermined position against the urging force of the torsion coil spring 24, in the present invention, such engaging portions may be provided otherwise on the head base 40.

Further, while the resilient member (spring 21) for urging the slide base 30 and the head base 40 in the direction to move away from the reel bases is engaged at an end thereof with the head base 40 in the present embodiment, it may otherwise be engaged with the slide base 30.

On the other hand, while in the tape player of the present embodiment the slide base 30 is driven to move toward the reel bases by the first or second change-over cam 16 or 17 which is rotated together with the mode change-over gear 15, the driving mechanism according to the present invention is not limited to this, and for example, an end portion of the slide base may be attracted toward the reel bases by means of a solenoid.

Since according to the present invention the upper guide lug 31 and the lower guide lug 32 are formed in an integral relationship on the slide base 30, only one additional guide pin is required for sliding movement of the slide base 30 and the head base 40 while two guide pins are required in the conventional tape player described hereinabove. Accordingly, the number of parts can be reduced as much.

Further, in the tape player of the present embodiment, first sliding movement of the slide base 30 on the head base 40 and second sliding movement of the slide base 30 (and the head base 40) on the chassis 1 are guided by the separate upper guide lug 31 and lower guide lug 32. Besides, the distance of the first sliding movement is very small comparing with the distance of the second sliding movement. Accordingly, the spacing on the head base 40 for such sliding movement to be assured around the upper guide lug 31 may be very small. Consequently, the space on the head base 40 can be used effectively as much, and the device can be reduced in overall size.

Furthermore, in the tape player of the present embodiment, a portion of the head base 40 around the guide slot 41 is held between the slide base 30 and the projections 31a which extend leftwardly and rightwardly from the upper guide lug 31 of the slide base 30. Accordingly, in an assembling operation of the device, the head base 40 and the slide base 30 can be treated as a unitary block, and accordingly, the assembling operation can be simplified significantly. Particularly in the case of the tape player of the present embodiment, since the urging forces acting in the directions of the arrow marks B and A are provided to the slide base 30 and the head base 40, respectively, by the torsion coil spring 24 while the slide base 30 is engaged at the engaging portions 35 thereof with the head base 40, it is possible to treat the slide base 30 and the head base 40 as a single unit.

It is to be noted that, while in the tape player of the present embodiment the guide slot 1c, guide lugs 31 and 32 and guide slot 41 are formed each for one on the chassis 1, slide base 30 and head base 40, respectively, the present invention is not limited to this, and they may be provided each for two or more on them.

Having now fully described the invention, it will be apparent to one of ordinary skill in the art that many changes and modifications can be made thereto without departing from the spirit and scope of the invention as set forth herein.

What is claimed is:

1. A tape player, comprising:
   a chassis;
   a reel base and a capstan supported for rotation on said chassis and connected to be driven to rotate by a motor;
   a head base supported for movement toward and away from said reel base and having a pinch roller shaft and a magnetic head secured thereto, said pinch roller shaft having a pinch roller supported for rotation thereon;
   a slide base interposed between and supported on said head base and said chassis for sliding movement toward and away from said reel base;
   a torsion coil spring including two ends engaged on one end thereof with said head base and at the other end thereof with said slide base for urging said head base to approach said reel base with respect to said slide base;
   an engaging element provided on at least one of said head base and said slide base for holding said head base and said slide base in a mutually overlapping condition against the urging force of said torsion coil spring;
   a resilient member for urging at least one of said slide base and said head base to move away from said reel base; and
   a driving mechanism for moving said slide base toward said reel base against the urging force of said resilient member.

2. A tape player, comprising a chassis, a slide base mounted for sliding movement in an overlapping relationship on said chassis, a head base mounted for sliding movement in an overlapping relationship on said slide base and having a magnetic head mounted thereon, and a driving mechanism for moving said slide base in a direction to contact said magnetic head with a magnetic tape, said slide base having an upwardly bent first guide element and a downwardly bent second guide element formed in an integral relationship thereon, said head base having a first guide slot formed therein, said first guide element of said slide base being inserted in said first guide slot of said head base for guiding said head base for sliding movement on said slide base, said chassis having a second guide slot formed therein, said second guide element of said slide base being inserted in said second guide slot of said chassis for guiding said slide base for sliding movement on said chassis.

* * * * *